United States Patent
Giannini

[15] 3,705,934
[45] Dec. 12, 1972

[54] METHOD FOR THE COVERING OF MOLDABLE ARTICLES (IN PARTICULAR, THE HEELS AND SOLES OF SHOES) AND MOLD FOR APPLICATION OF SAID METHOD

[72] Inventor: Michele Giannini, Via Imbriani, 81, Barletta, Italy

[22] Filed: July 14, 1969

[21] Appl. No.: 841,536

[30] Foreign Application Priority Data

July 12, 1968 Italy..........................916/68
Feb. 17, 1969 Italy..........................905/69
June 16, 1969 Italy..........................914/69

[52] U.S. Cl......................264/219, 18/42 H, 156/79, 264/244
[51] Int. Cl. .............................................A43d 65/00
[58] Field of Search........156/196, 380, 500, 79, 295; 51/240, 291; 12/49.1; 264/244, 275, 219, 277, 278, 261, 275; 249/91; 18/30 US, 42 H

[56] References Cited

UNITED STATES PATENTS 3,421,183  1/1969  Grimmeisen................18/42 H
831,151   10/1906  Gaeth........................51/290 X
1,747,629  2/1930  Hansen......................51/290 UX
1,860,158  5/1932  Peterson..................156/196 UX
2,006,377  7/1935  Wheeler...................156/196 X
3,513,050  5/1970  Samuels et al.............156/196

FOREIGN PATENTS OR APPLICATIONS 944,545  12/1963  Great Britain.............156/295

Primary Examiner—Benjamin A. Borchelt
Assistant Examiner—G. E. Montone
Attorney—Edwin E. Greigg

[57] ABSTRACT

A method for the partial or total covering of any moldable article (particularly suitable for the heel and soles of shoes), characterized by the fact that the said covering is carried out during the molding, by placing the covering, which has previously been cut out or sliced off in the desired shape, against the surface of the mold, in areas corresponding to those of the molded piece that have to be covered, the limits of the said areas having been at least partly marked by protruding parts located on the walls of the mold itself.

3 Claims, 7 Drawing Figures

METHOD FOR THE COVERING OF MOLDABLE ARTICLES (IN PARTICULAR, THE HEELS AND SOLES OF SHOES) AND MOLD FOR APPLICATION OF SAID METHOD

The object of the present invention is a new, simple, quick and economical method for the partial or total covering of any moldable article.

This method is particularly useful for the total or partial covering of the heels or soles of shoes produced by stamping, injection-molding, or any other means. Up to now such covering has been performed by glueing the covering layer to the surface to be covered, at the cost of considerable time and labor.

The method in accordance with the invention achieves such covering by placing the piece constituting the covering, which has previously been cut out or sliced off ( or obtained by any other means whatever) in the desired shape, inside the mold, laying it against the surfaces of the latter in position corresponding to the parts of the article to be covered. The heel or sole is then made by stamping, injection-molding, or by any other method. The material inserted in the mold will then take shape inside the covering, and, by pressing itself and the covering against the surfaces of the mold, will become anchored and welded to the covering, at the same time taking on its permanent shape and being permanently covered.

By this method it is easy to perform the partial or total covering of the heel of a shoe, with or without the addition of a filler or reinforcing material of any suitable kind. It is also possible to reproduce limitations, by means of this latest, simple, speedy and economical technique, of classic styles of covering, and to obtain new effects, so far never achieved with the same ease and perfection. Indeed—still taking as our example the covering of the heel of a shoe, since the heel, at the moment when it is covered, is a plastic material—the said plastic penetrates into all the cracks and hollows it encounters, and this makes it possible to obtain coverings with imitation frets and various ornamental designs or motifs, which look as though they have been printed, in two or more colors, on the covering itself.

Apart from this color-effect, it is possible to exploit the contrast caused by reflected light between the surfaces where the plastic material shows and the surfaces that are covered. This is done by an appropriate choice of material for the covering and of the type of finish that can be applied to the surfaces of the mold.

It would be practically impossible to obtain these effects by traditional methods of covering.

If the material with which it is intended to do the covering is such that it cannot be welded to the material used for molding the article, the covering may be coated with a suitable glue, or similar substance, before being placed in the mold.

The attached drawings are diagrams of some of the ways of performing the process in accordance with the present invention, as follows.

The example that follows, described with reference to a process for forming the heel or sole of a shoe by injection-molding, is not meant as a limitation, but only as an illustration, being generally valid for any other process for forming the said heel or sole, such as stamping, by means of the self-expanding of the material used, etc.

Figure 1:
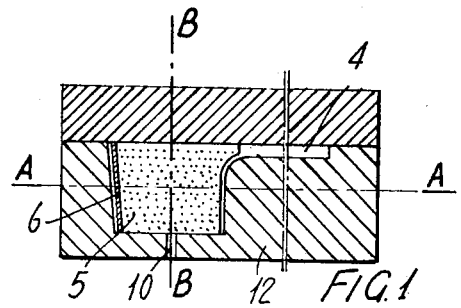
FIG. 1 represents a median longitudinal cross-section of the mold and the covering, before any material has been injected.

As will be seen from the figures, 5 indicates the internal surface of the covering 6, which will come into direct contact with the plastic material to be injected through the aperture 10 within the cavity 4 of the mold (FIG. 1). The space 7 (FIG. 4) is designed to receive the plastic material forming the bottom of the heel and the space 8 ( FIG. 4) is designed to receive the part of the plastic material forming the artificial sole running along the upper rim of the heel.

11 indicates those parts of the mold known as "rings," which reproduce the side surfaces of the heel and the sole.

Figure 2:
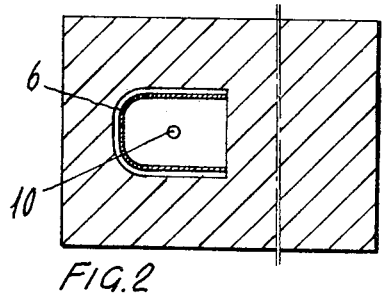
FIG. 2 represents the horizontal cross-section corresponding to A—A in FIG. 1.
Figure 3:
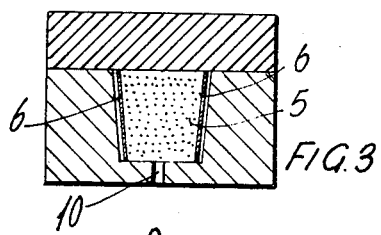
FIG. 3 represents the transversal cross-section corresponding to B—B in FIG. 1.

The pins 9 (FIGS. 4, 5 and 6) mark the edge of the area to which the covering 6 is to be fixed so that the latter will not move when injection takes place. These support-pins 9 are not necessary in FIGS. 1, 2 and 3, because the covering 6 rests, on one side, on the bottom of the mold 12 that reproduces the heel and the lower surface of the sole and, on the other, against that part 13 of the mold that reproduces the upper surface of the sole.

Figure 6:
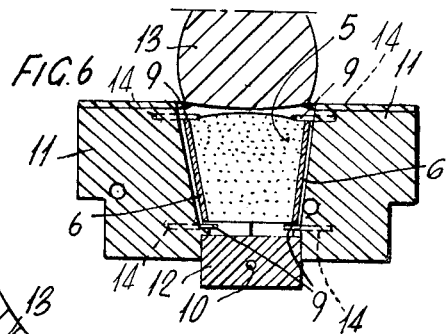
FIG. 6 represents the transversal cross-section of the mold in the area of the heel, corresponding to D—D in FIG. 4.
Figure 4:
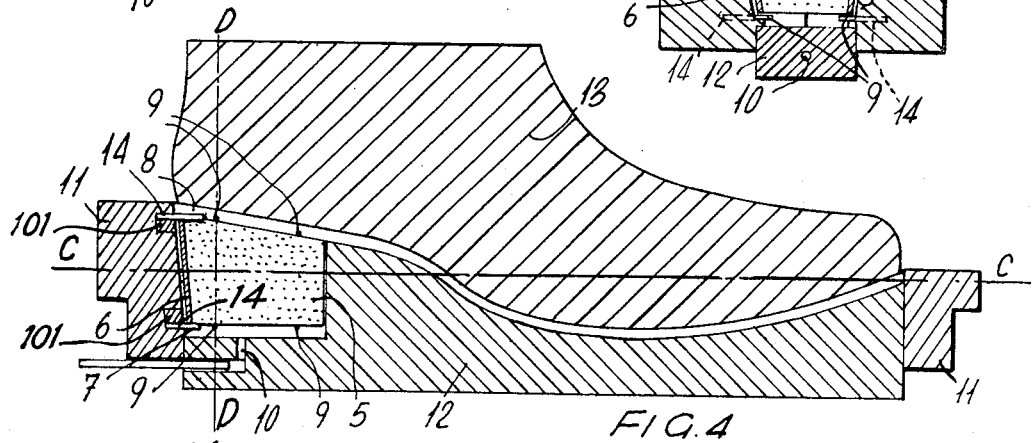
FIG. 4 represents a median longitudinal cross-section of the mold for the heel, the sole, and the covering, before the material has been injected.
Figure 5:
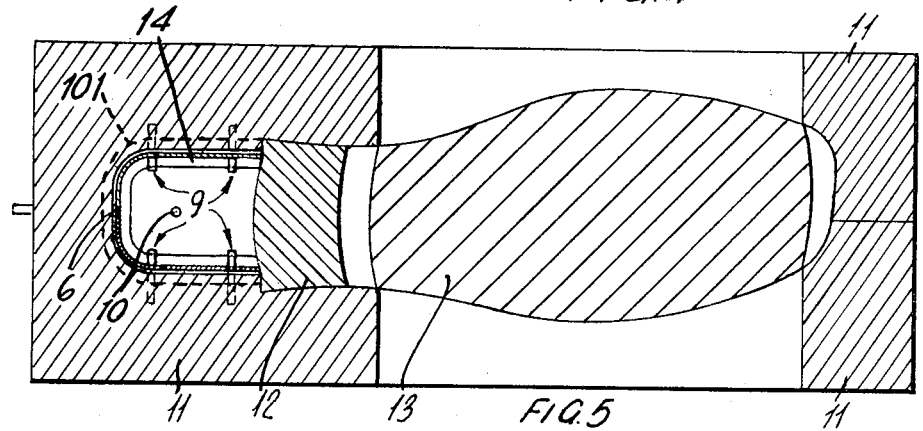
FIG. 5 represents the horizontal cross-section in accordance with C—C in FIG. 4.
Figure 7:
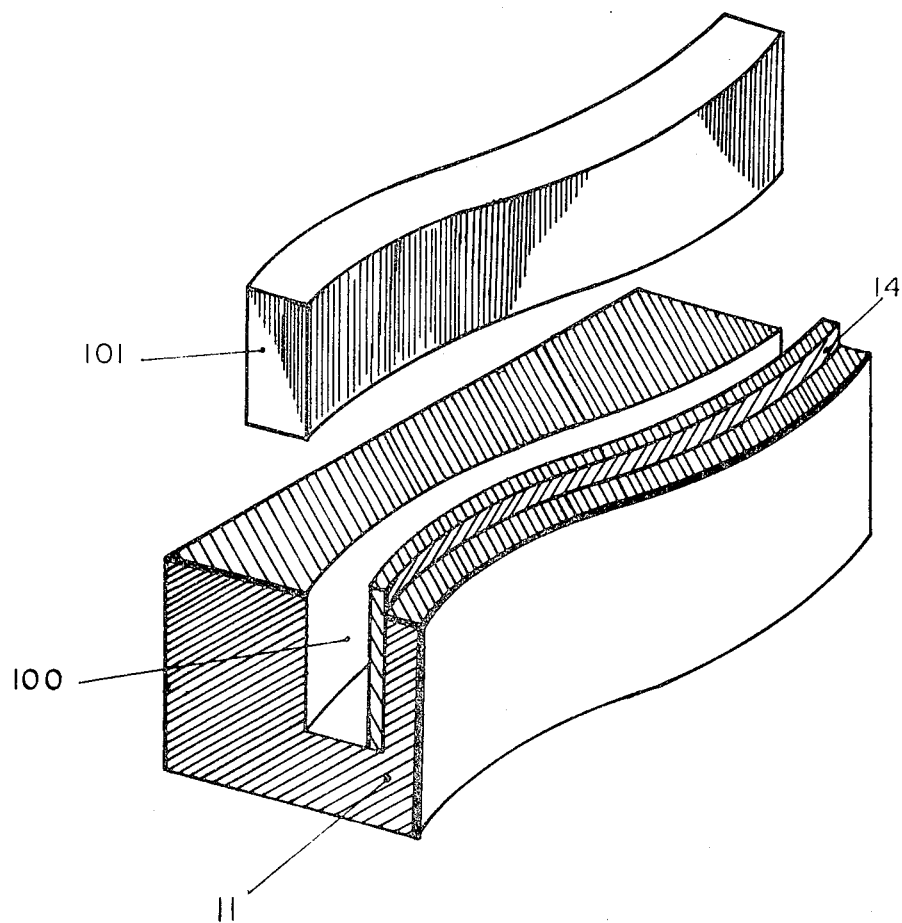
FIG. 7 is a perspective view of a portion of a mold which has been slotted to receive a blade and holding means therefor.

In the examples given in FIGS. 4, 5 and 6, however, in which the covering 6 is suspended between the space 7 and the space 8, it is necessary to fix the covering 6 by means of protruding edge-markers, which are the support pins 9.

The present invention also offers another means for determining the position of the covering 6 against the wall of the mold 12, and this means consists of embedding in the wall of the mold 12 a very thin blade of metal, which protrudes from the surface of the mold, thus forming a frame 14 designed to contain and hold the perimeter edges of the covering 6.

Obviously, when the metal blade 14 is used, the pins 9 are not used and vice versa.

The process by which the protruding blades 14 are embedded in the inside wall of the mold, by an economical, convenient and efficient method, will be hereinafter described.

The method so far described can be applied in all cases in which the covering 6 is such that it can be inserted in the mold before the latter is completely closed, and before injection of the plastic material forming the article to be covered. This material, which has to be injected into the mold through at least one aperture 10, whose position is chosen in such a way that the said material will flow against surface 5 of the covering 6, so that the latter is brought into contact with the surface of the piece that it is intended to cover. The inserts 14 for holding in place the covering 6 are made of thin blades of metal, and are embedded in the walls of the mold (11 and 12), so as to intersect the surfaces of the latter and to protrude from them so as to partly or totally mark out those parts of the surface of the mold whose shape corresponds exactly to the covering to be applied to the article concerned.

These blades are applied in such a way as to protrude, preferably to the same extent, from the surfaces of the mold, thus forming a sort of frame or enclosing edge 14 and totally or partially marking the limits of the surface of the mold corresponding to the areas of the article to be covered—such as the heel of a shoe, for example. The amount the blades 14 protruding from the surface of the mold may vary to a considerable extent, depending on the type and thickness of the material used for the covering and the thickness of the article being molded in the area that is to be covered.

The thickness of the blades is also subject to considerable variation; but it should be borne in mind that it is nearly always an advantage to use very thin blades, so that the joint between the covering and the finished piece does not show. The thickness of the blades should preferably be kept within a few tenths of a millimeter. A further purpose of the present invention is to describe a simple and accurate method of inserting the thin blades in the inside of the molds—for it would appear hardly possible to insert thin blades no more than a few tenths of a millimeter thick to a depth of 4 or 5 mm, making a correspondingly small slit in the inside wall of the mold with the aid of an electric etcher, or any other type of cutting instrument or machine. To obviate this difficulty, therefore, the present invention proposes the following procedure:

a. Cavities 100 are made in the molds, preferably with a flat base and cylindrical walls, of which at least one should follow the line along which it is intended to insert the blade. The cavities are made by means of a cutter, whose axis of rotation is oriented with the generating lines of the cylinder, whose directrix is the line itself, and whose generating lines are the straight lines produced through the line and parallel to the direction considered most suitable for the extraction of the molded article and, at the same time, for keeping the covering in the desired position during molding operations.

b. The blade to be inserted is shaped in such a way that it can be exactly superimposed on the cylindrical wall obtained in the way described in (a). This shaping can be done, for example, in accordance with the known method for making light-steel, hollow punches for making parts for shoes, by executing a flat shape in sheet-metal or with a suitable type of cardboard, thus reproducing on one of its edges the cylindrical wall section, with one surface perpendicular to its generating lines. This shape is obtained easily by copying, directly from the cavity, the perimeter of the latter's base and using the corresponding part for the aforementioned section.

c. The blade 14 shaped in this manner is placed, parallel to the aforementioned cylinder, inside the cavity 100 and against the former, so that the outer corners of the blade are exactly superimposed on the outer corners of the cylinder itself.

d. A piece 101 is then made to insert in the cavity 100 made in the wall of the mold, in which the blade 14, as described in (c), has already been laid, employing a cutter or pantograph, or the like, in such a way that the said piece 101 may be properly inserted with a minimum of play in the cavity 100 itself, which already contains the blade 14 in the desired position, and so that this piece can if necessary be fixed by certain means (such as screws, bolts, pins etc.) accessible from the outside of the mold.

e. The height of the piece 101 and of the blade 14 should, as a general rule, be greater than or equal to that of the cavity 100. When this operation has been completed, the next step is to machine the mold, after which the blade 14 will be at the same level as the surface of the mold. In order to have the blade 14 protruding again, it will be necessary to extract once more both blade 14 and the piece 101 inserted. The blade must then be corrected, readjusting its level and then cutting a new blade of the same shape, using the first one as a model, but making the blade higher by the amount it is desired that it should protrude from the surface of the mold; the blade is reshaped as in the first instance and again inserted in the cavity in the mold, with the base still coinciding with that of the cavity.

Another version of the operation would be to shift the blade relative to the inserted piece by the extent to which it is desired that it protrude from the surface of the mold, fixing it to the piece in that position and again inserting the whole thing in the cavity. All the above-described operations can be performed in reverse order, first making the piece to be inserted in the mold, then shaping and placing the blade on it, and lastly making in the mold a cavity suitable for receiving the said piece with the blade fixed to it. The said cavity may be made in two different ways: either by cutting into the mold with suitable copying apparatus a cavity having cylindrical walls to fit, with the minimum play, the cylindrical walls of the piece to be inserted, oriented in such a way that the blade fitted to it remains in the desired position in the finished mold; or else, by scribing on the mold, perpendicular to the direction of the generating lines of the cylinder of the piece, the cross-section of the piece with the blade fixed to it, with a surface perpendicular to the cylindrical walls themselves (base of piece), orientated in such a way that the blade ends up in the right position in the mold.

Having done this, it will be possible to cut away all the material of the mold within the area marked out, including the markings themselves. In the special case of the blades to be inserted being flat, because the lines along which they have to be inserted are straight, or else because there are straight lines contained within the surfaces themselves along which it is desired to insert the blade, the said blades, being already flat, do not have to be shaped. The method described may in such a case be carried out with the following variations. In this case, the axis of rotation of the cutter employed to make the cavity need not necessarily be parallel to the surface on which the blade is to be placed, but may also be perpendicular to it. If the aforementioned cavity is made in such a way that the piece to be inserted can be inserted so that its surfaces rub slightly against the walls of the cavity in a direction parallel to the surface into which the blade is to be inserted, but at least in a perpendicular direction, it will be possible to carry out the two following variants of the operation:

f. A piece is made that is an exact copy of the cavity, while keeping the same, essential degree of play, the blade not having yet been placed in the desired position. The blade is then placed in the desired position, and the piece is inserted in the cavity against the blade in contact with the latter. The piece is fixed in the cavity with suitable bolts or screws, which press it against the blade, after which any part of the piece that protrudes too far from the cavity, because of the extra thickness due to the presence of the blade, is cut or filed away.

g. In the cavity, in the area in which the blade is to be placed, there is put any piece of blade of the same thickness as the blade that will eventually be inserted, this blade being designed only to supply the right degree of thickness, as a temporary measure. The piece or metal insert is then made, as stated in (f) above, after which the mold is machined and finished. When the mold is finished, the temporary piece of blade is removed and the final version of the blade inserted, cutting it so that it protrudes from the surfaces of the mold to the extent desired.

According to another variant, which can be applied if the blade is arranged along straight or flat lines, the blade, or any piece of blade, which serves to supply the necessary thickness, is placed on the piece from which it is intended to make the insert to be set in the cavity; this is done after suitable smoothing of the first surface, which will be assumed to be the surface in contact with the blade, when the latter is in the desired position. The piece to be inserted in the cavity is then made from the piece so arranged and orientated.

The metal piece or insert, with the blade (or temporary blade) attached, is then inserted in the cavity in the mold. The machining of the mold is then completed, and finally, the first blade (or the temporary piece of blade) is replaced by the final blade, cut in such a way that it protrudes from the surfaces of the mold to the desired extent.

In certain cases, along any closed or open lines along which it is desired to insert blades, it is possible to insert a piece made from suitable sheet-metal (of appropriate thickness), shaped like the blades themselves, as previously described, and to insert this piece in the cavities made in the molds. Such a piece may be considered and applied as equivalent for all practical purposes to pieces copied with cutters or pantographs, (or, in cases in which it is possible and convenient, it can be adapted manually with a file or flexible, portable cutter).

In this case, the general method described is varied in the following manner:

Cavities are made in the mold by cutting along the lines along which it is intended to place the blades in such a way as to touch the lines themselves at all points, with a cutter whose diameter is equal to the thickness of the blade plus that of the sheet-metal from which it is intended to shape the metal insert, and plus any play necessary for inserting in the cavities made the blades and inserts.

The shaping of the blade is easily done with the machinery normally used for making hollow punches for cutting materials for shoes. The rest of the operation is carried out as previously described. In special cases, it will be possible to use a suitable sheet, metal, shaping it to the lines around which it is desired to place the blades, as follows:

h. By cutting, if necessary, along the lines along which it is desired to place the blades with a suitable cutter, in order to obtain the parts of the cylinders that have as their directrixes the lines themselves.

i. By placing along the lines themselves, along which the blades, held in place by some suitable means, have been arranged, the sheet-metal, and gradually shaping it along and on the lines themselves, as well as gradually fixing it, if necessary to the walls of the cylinders, whose directrixes are the lines and to the blades themselves, fixed in between with suitable bolts or screws.

l. In many cases, in which the sheet-metal is so arranged as to be next to the surfaces of detached or detachable pieces of the mold, if necessary, on the sheet-metal, there may afterwards be performed the necessary cutting and filing operation to adapt the piece on which the sheet-metal has been placed.

What is claimed is:

1. A method of making the heel of a shoe comprising the steps of
   A. providing a mold having a cavity configured to produce the heel and including a curved vertically extending wall,
   B. inserting and fixing horizontally extending very thin blades in the curved vertically extending wall of the cavity, said blades following the curvature of the wall being vertically spaced and projecting into the cavity a small amount,
   C. placing a preformed covering material against the curved vertically extending wall of the cavity and abutting a continuous extent of both the upper edge and the lower edge of the material against the blades so as to be held in position thereby,
   D. injecting a plastic material into the cavity of the mold to press the preformed covering material against the wall of the mold and to bond with the plastic,
   E. permitting the plastic material to harden and bond to the preformed cover and
   F. removing the injected molded heel with its cover from the mold.

2. The method of claim 1, in which the step of inserting and fixing the very thin blades in the mold includes
   A. forming a groove in the vertically extending wall of the cavity,
   B. placing a said blade in the groove and against the bottom side wall of the groove and
   C. snugly fitting a member into the groove to hold the blade in place.

3. The method of claim 2, further including the steps of
   A. placing a preliminary blade and said member into the groove,
   B. machining the wall of the mold in which the blade is located to final dimensions,
   C. removing the member and preliminary blade from the groove,
   D. making a new blade of the desired lateral dimension using the preliminary blade as a model and
   E. inserting the new blade and the member into the groove.

* * * * *